(12) United States Patent
Johnson

(10) Patent No.: US 9,258,984 B2
(45) Date of Patent: Feb. 16, 2016

(54) MULTILEVEL BIRDBATH AND REMOVABLE LINER

(71) Applicant: Mark V. Johnson, San Jose, CA (US)

(72) Inventor: Mark V. Johnson, San Jose, CA (US)

( * ) Notice: Subject to any disclaimer, the term of this patent is extended or adjusted under 35 U.S.C. 154(b) by 84 days.

(21) Appl. No.: 13/653,357

(22) Filed: Oct. 16, 2012

(65) Prior Publication Data

US 2013/0036979 A1 Feb. 14, 2013

Related U.S. Application Data

(63) Continuation-in-part of application No. 29/377,189, filed on Oct. 18, 2010, now Pat. No. Des. 669,230.

(51) Int. Cl.
*A01K 45/00* (2006.01)
*B05B 17/08* (2006.01)

(52) U.S. Cl.
CPC ............... *A01K 45/002* (2013.01); *B05B 17/08* (2013.01); *Y10T 29/49716* (2015.01)

(58) Field of Classification Search
CPC .............................. A01K 45/002; B05B 17/00
USPC .............................. 119/69.5; D30/123; 239/17
See application file for complete search history.

(56) References Cited

U.S. PATENT DOCUMENTS

| | | | |
|---|---|---|---|
| 490,378 A | 1/1893 | Trouve | |
| 1,224,305 A * | 5/1917 | Kraus | 119/69.5 |
| D75,179 S | 5/1928 | Leon | |
| D75,180 S | 5/1928 | Leon | |
| D87,364 S | 7/1932 | Spindler | |
| D120,620 S | 5/1940 | Johnson | |
| D172,710 S | 7/1954 | Freitag et al. | |
| 2,715,386 A * | 8/1955 | Norvel | 119/51.5 |
| D185,224 S | 5/1959 | Mifsud | |
| 2,966,839 A * | 1/1961 | Ferrara et al. | 99/346 |
| 3,324,834 A | 6/1967 | McKinstry | |
| D209,034 S | 10/1967 | Johnson | |
| 3,595,478 A | 7/1971 | Power | |
| 3,648,659 A * | 3/1972 | Jones | 119/69.5 |
| D224,573 S | 8/1972 | Hauser | |
| D231,457 S | 4/1974 | Jepsen et al. | |
| 3,814,317 A | 6/1974 | Hruby, Jr. | |
| 3,901,439 A | 8/1975 | Willis | |
| D247,187 S * | 2/1978 | Hartinger | D30/123 |
| 4,441,459 A | 4/1984 | Giordano | |
| D301,776 S | 6/1989 | Ochs | |
| D321,572 S * | 11/1991 | Laden | D30/129 |
| 5,062,390 A | 11/1991 | Bescherer et al. | |
| 5,134,968 A * | 8/1992 | Yancy | 119/57.8 |

(Continued)

FOREIGN PATENT DOCUMENTS

JP 05292850 A * 11/1993 ............. A01K 45/00

OTHER PUBLICATIONS

JP 5-292850 machine translation.*

*Primary Examiner* — Son T Nguyen
(74) *Attorney, Agent, or Firm* — Ray K. Shahani, Esq.; Kin Hung Lai, Esq.

(57) ABSTRACT

A multilevel birdbath consists of a main body that has a concave, contoured inside surface and an exterior lower surface, the main body further has a flat rim surrounding the concave inside surface and the concave inside surface optionally has stepped areas fluctuating in height and a sloping portion such that the stepped areas would create different depths of the multilevel birdbath which can accommodate and attract birds of different sizes and species.

5 Claims, 11 Drawing Sheets

(56) References Cited

U.S. PATENT DOCUMENTS

| | | |
|---|---|---|
| D330,097 S | 10/1992 | Bescherer et al. |
| D343,442 S | 1/1994 | Cooper |
| D352,138 S | 11/1994 | Tucker et al. |
| 5,412,818 A * | 5/1995 | Chen ................................. 4/642 |
| 5,493,999 A | 2/1996 | Schenck |
| D383,571 S | 9/1997 | Frodsham |
| 5,775,586 A | 7/1998 | Hamilton-Bruzzi et al. |
| D412,768 S | 8/1999 | Huettner et al. |
| D424,250 S | 5/2000 | Clifton |
| D424,757 S | 5/2000 | Cooper et al. |
| D436,656 S | 1/2001 | McKeone |
| D437,383 S | 2/2001 | Sater et al. |
| D454,612 S | 3/2002 | Chang |
| D454,613 S | 3/2002 | Wood |
| D473,020 S | 4/2003 | DeRaspe-Bolles et al. |
| D479,586 S | 9/2003 | Piatt |
| D492,070 S | 6/2004 | Evans et al. |
| D498,292 S | 11/2004 | Piatt |
| D498,564 S | 11/2004 | Northrop et al. |
| D508,362 S | 8/2005 | Town |
| D562,645 S | 2/2008 | Ishai |
| D588,674 S | 3/2009 | Scali et al. |
| D604,798 S | 11/2009 | Scali et al. |
| D633,661 S | 3/2011 | Kellogg et al. |
| D643,503 S | 8/2011 | Haijin |
| D652,174 S | 1/2012 | Cote |
| D656,282 S | 3/2012 | Dixon et al. |
| 8,499,375 B2 * | 8/2013 | Kim et al. ......................... 4/619 |
| 2006/0169213 A1 * | 8/2006 | Montie et al. ................. 119/69.5 |
| 2007/0056519 A1 * | 3/2007 | Palmer ........................ 119/57.8 |
| 2007/0209600 A1 | 9/2007 | Flowers et al. |
| 2011/0240757 A1 | 10/2011 | Selk et al. |
| 2011/0309159 A1 | 12/2011 | Goldsmith |

* cited by examiner

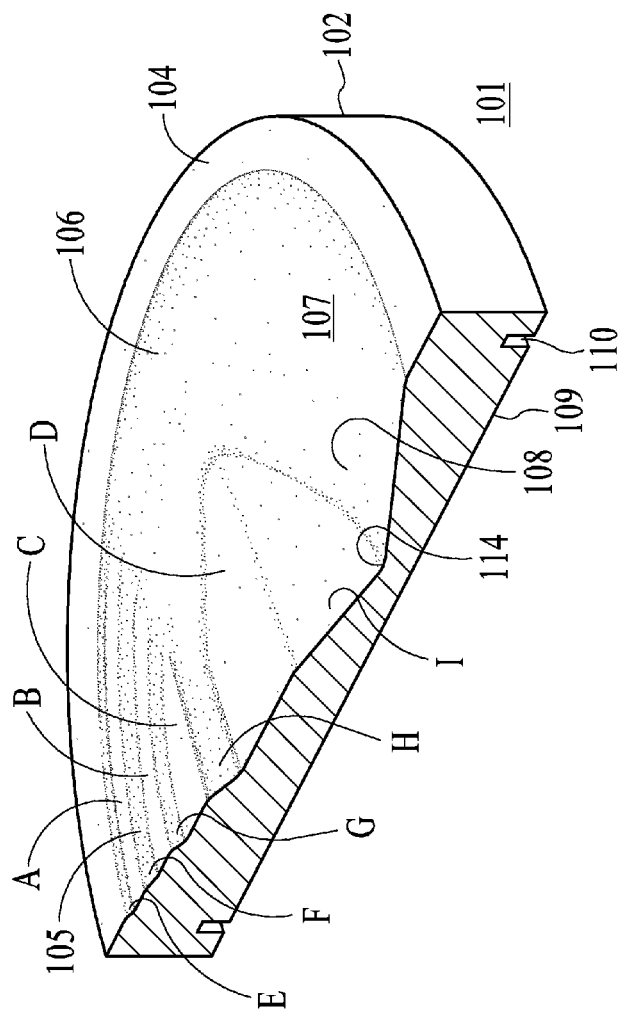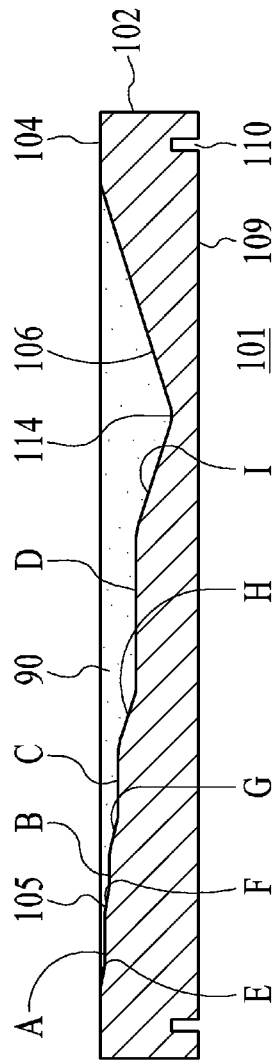
FIG. 4
FIG. 5

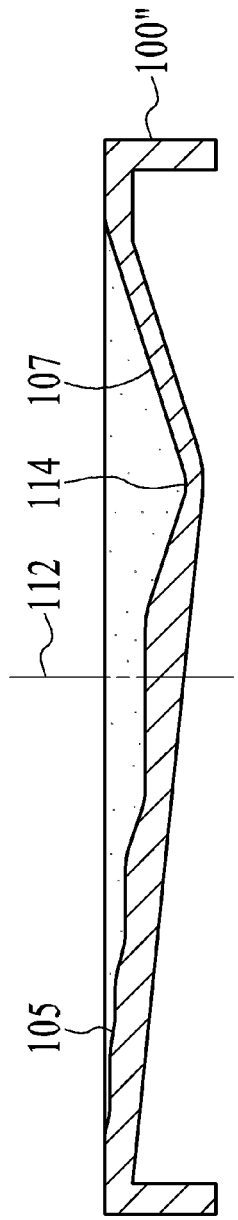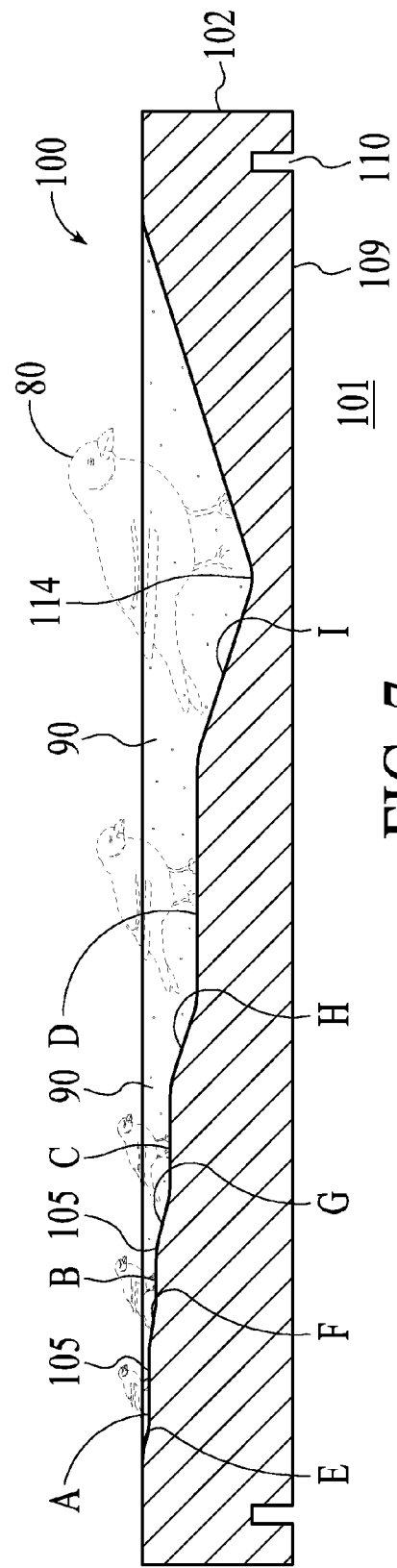

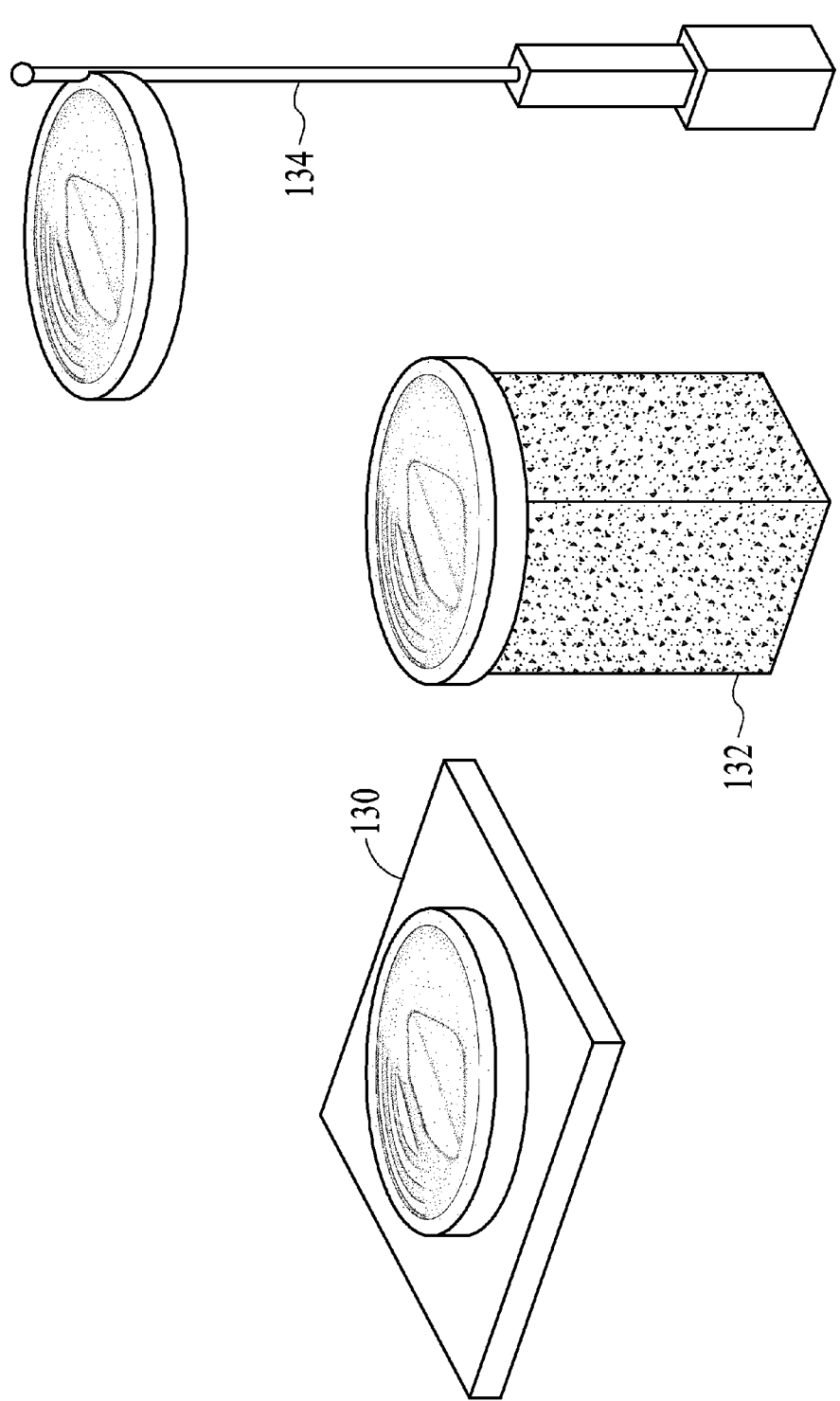

9,258,984 B2

MULTILEVEL BIRDBATH AND REMOVABLE LINER

RELATED APPLICATIONS

This Application is continuation-in-part of and related to U.S. Design patent application Ser. No. 29/377,189 filed Oct. 18, 2010, to be issued as D669,230 on Oct. 16, 2012, entitled DESIGN FOR MULTILEVEL BIRDBATH, which is incorporated herein by reference in its entirety, and claims any and all benefits to which it is entitled therefrom.

FIELD OF THE INVENTION

This invention relates to a multilevel birdbath and/or a removable liner for conventional birdbaths, and more particularly to a birdbath that features multiple pools with different depths which accommodate and attract birds of different sizes and species.

BACKGROUND OF THE INVENTION

This invention relates to an improvement on current birdbaths. A birdbath is an artificial "puddle" or small shallow pond, created with a water-filled basin, for birds to bathe and 'cool off' in, and drink from. A birdbath can be a garden ornament, small reflecting pool, outdoor sculpture, or part of creating a vital wildlife garden.

A birdbath requires regular maintenance. Maintenance may be as simple as a daily quick wash and refill, but it will depend on the birdbath materials. This is important because of the possible adverse health effects of birds drinking dirty water, or water which may have become fouled with excrement, algae, or fungi. Fresh water is important. Concrete bird baths tend to become mossy and, therefore, slippery—requiring an occasional scrubbing out with a stiff brush. Conventional birdbaths can be troublesome in maintaining. The ideal conditions for birds of varying sizes being largely a matter of depth and cleanliness of water. If the water is too deep or too shallow, birds will not or cannot avail themselves of bathing and/or drinking.

Applicant submits that there is no birdbath found in the marketplace that has a gradual sloping and/or multilevel bottom birdbaths that accommodates birds of varying sizes and species to perch, bathe and drink.

ADVANTAGES AND SUMMARY OF THE INVENTION

The present invention relates to birdbaths, specifically to varying depth birdbaths and birdbaths with stepped, sloping or otherwise contoured lower surfaces.

One object and advantage of the present invention is to accommodate birds of varying sizes and species to bathe, perch and drink.

Another object and advantage of the present invention is to provide a removable birdbath liner surface which is contoured, stepped and/or sloping and can be easily cleaned.

Yet another object and advantage of the present invention is to provide flexibility in adding and adapting a lower, stepped and/or contoured lower interior surface to existing birdbaths of varying dimensions and configurations.

Further details, objects and advantages of the present invention will become apparent through the following descriptions, and will be included and incorporated herein.

BRIEF DESCRIPTION OF THE DRAWINGS

All drawings are of an embodiment of a multilevel birdbath and related shape and configuration, other birdbaths can differ in size, shape, material, color and/or finish.

FIG. 4 is a representative isometric cross-sectional view of an embodiment of a multilevel birdbath 100 of the present invention.

FIG. 5 is a representative vertical cross-sectional view of an embodiment of a multilevel birdbath 100 of the present invention.

FIG. 6 is a representative vertical cross-sectional view of an embodiment of a multilevel birdbath removable liner 100" of the present invention.

FIG. 7 is a representative view of application of an embodiment of a multilevel birdbath 100 of the present invention.

FIGS. 11A-11C are representative isometric views of embodiments of the multi-level birdbath 100 of the present invention in which the supporting structure of the multi-level birdbath of the present invention consists of a platform, a block of material, and a pole.

DETAILED DESCRIPTION OF THE PREFERRED EMBODIMENT

Figure 1:
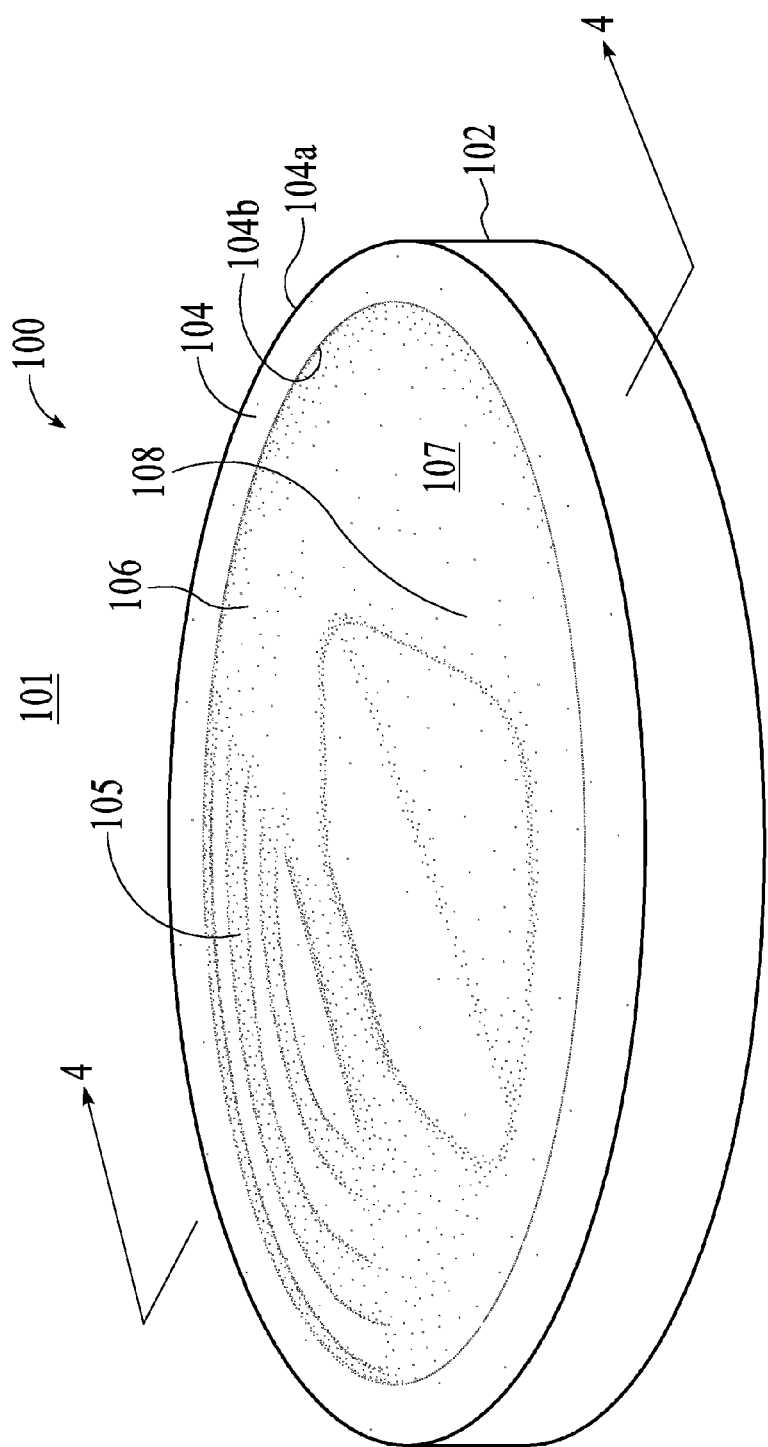
FIG. 1 is a representative isometric view of an embodiment of a multilevel birdbath 100 of the present invention.

The description that follows is presented to enable one skilled in the art to make and use the present invention, and is provided in the context of a particular application and its requirements. Various modifications to the disclosed embodiments will be apparent to those skilled in the art, and the general principals discussed below may be applied to other embodiments and applications without departing from the scope and spirit of the invention. Therefore, the invention is not intended to be limited to the embodiments disclosed, but the invention is to be given the largest possible scope which is consistent with the principals and features described herein.

It will be understood that in the event parts of different embodiments have similar functions or uses, they may have been given similar or identical reference numerals and descriptions. It will be understood that such duplication of reference numerals is intended solely for efficiency and ease of understanding the present invention, and are not to be construed as limiting in any way, or as implying that the various embodiments themselves are identical.

FIG. 1 is a representative isometric view of an embodiment of a multilevel birdbath 100 of the present invention. As shown in FIG. 1, multilevel birdbath 100 of the present invention resembling a shallow basin having a circular shape. In one embodiment, multilevel birdbath 100 consists of side wall 102, rim 104 and bottom surface 108. Multilevel birdbath 100 can be entirely and/or partially made of cement, faber glass, plastic, Silicones depending on whether multilevel birdbath 100 is a fixture or used as a replaceable and removable liner to an existing birdbath. In one embodiment, in the case that cement is being used as a building material, multilevel birdbath 100 needs to have a relatively uniform thickness to avoid stress fractures during the curing process.

As best shown in FIG. 1, rim 104 functions as a dam to stop water from overflowing from birdbath pool 106 of multilevel birdbath 100. When multilevel birdbath 100 is filled with water to the rim 104, due to the contour of bottom surface 108, water body 90 of varying depths will be available for birds of vary sizes to rest on. Moreover, the rim 104 can be of varying widths, such as but not limited to 0 to 2 inches, and can also have one or more grooves thereon in order to prevent water from settling on the rim 104.

In addition, it will be understood that the multilevel birdbath 100 can be hollow, such as cast. It can also be made of a material selected from the group of materials consisting of cement, concrete, plaster of Paris, wood, rubber, resin, fiberglass, reinforced fiberglass, plastic, metal, natural fiber and composite materials.

The stepped or otherwise contoured portion 105 of the present invention is very important. Often birds of varying sizes or species will prefer not to stand on a sloping portion 107 but prefer a flat step or area to sit or lie on. Discrete steps 105 provide an alternative to a sloping surface 107 this is at once inviting, protective, uniform with regard to the width of the step and offering of variation for birds of varying sizes and species.

In one embodiment, multilevel birdbath 100 can be installed on any surfaces, stands and/or pedestals and used independently as a birdbath. In one alternative embodiments, multi-level birdbath 100 can be placed on top of an existing birdbath as an addition or replacement. In one embodiment, multi-level birdbath 100 can be fitted in a custom frame [not shown] with a centered post.

Figure 2:
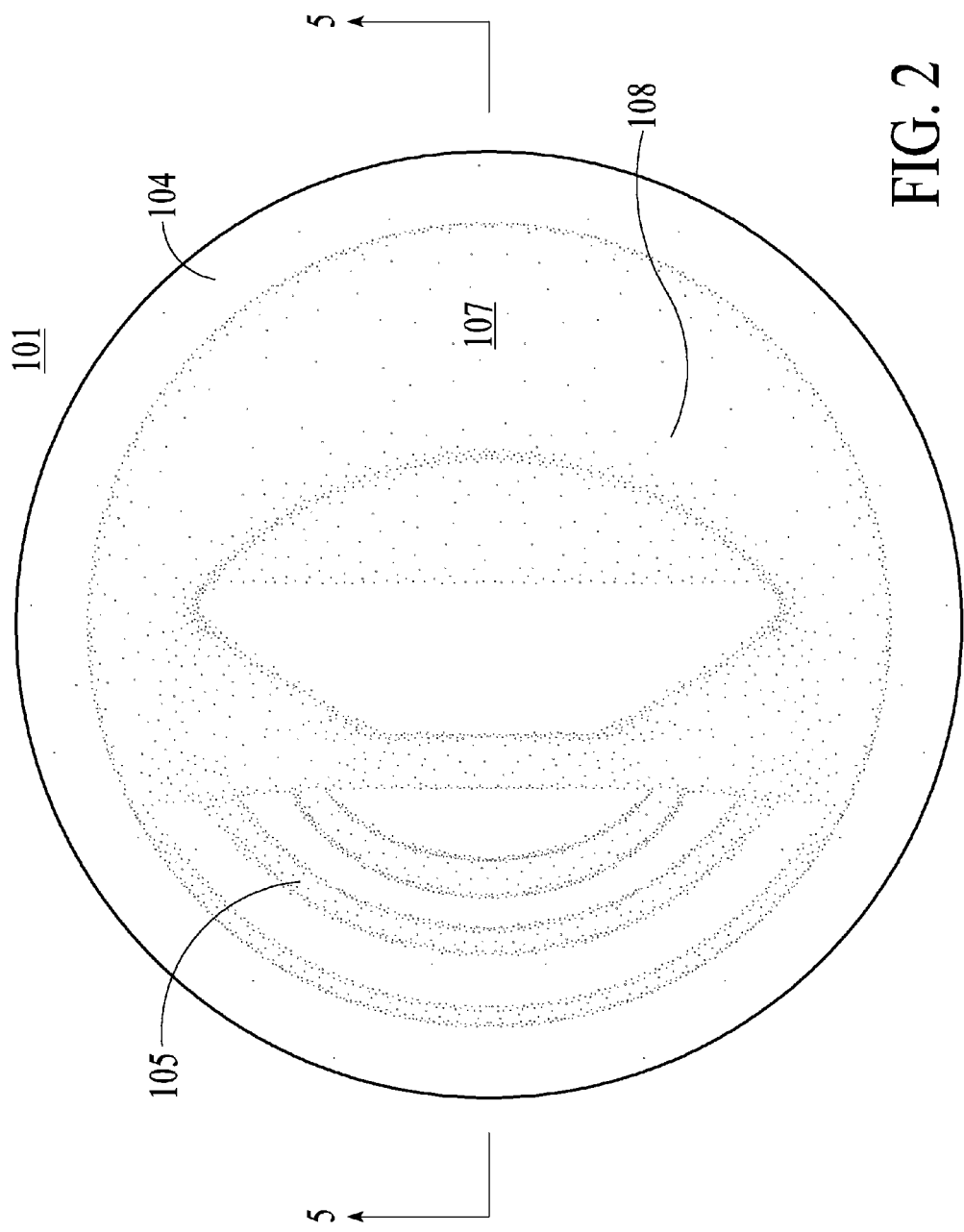
FIG. 2 is a representative top view of an embodiment of a multilevel birdbath 100 of the present invention.

FIG. 2 is a representative top view of an embodiment of a multilevel birdbath 100 of the present invention. In one embodiment, multilevel birdbath 100 is circular in shape. However, in alternative embodiments, multilevel birdbath 100 can adapt other regular shapes such as square, rectangular, oval, etc., to suit varying aesthetic purposes. As shown in FIG. 2, rim 104 is a flat surface having an approximate width of between 0 inch to 5 inches. In alternative embodiments, rim 104 can also be rounded or patterned. In one embodiment, bottom surface 108 starts to gradually sloping down from rim 104 in the approximate range of 5% to 20%. In one embodiment, grade throughout bottom surface 108 varies such that areas of different water depths are available for birds of vary sizes to stand on.

Figure 3:
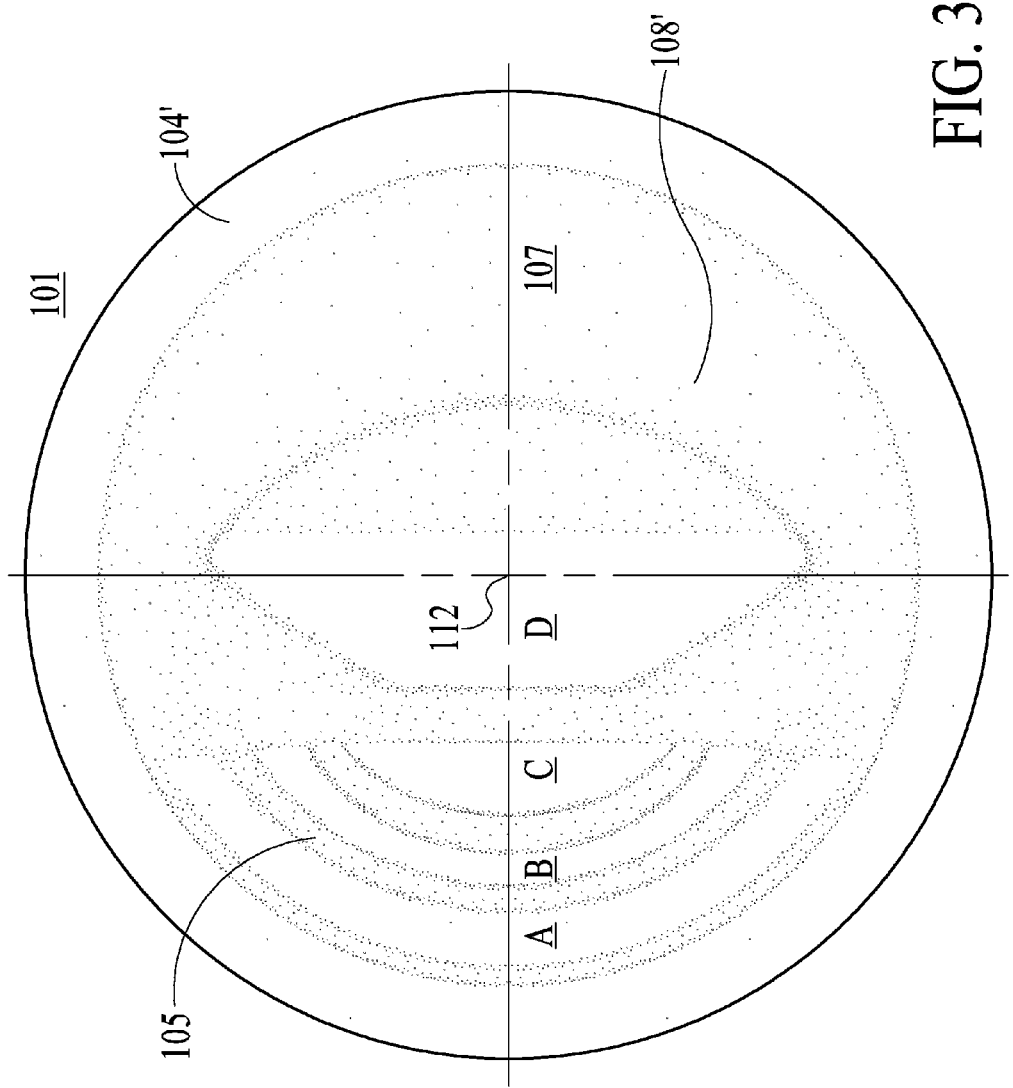
FIG. 3 is a representative top view of an embodiment of a multilevel birdbath 100' with specific dimensions of the present invention.

FIG. 3 is a representative top view of one specific embodiment of multilevel birdbath 100' with specific dimensions. In this embodiment, rim 104' is 2" wide and flat, bottom surface 108' starts to grade downward gradually from rim 104' and subsequently sloping upward or downward randomly to form various shaded areas as shown in FIG. 3. In this particular embodiment, stepped area A is ⅛" lower than rim 104', stepped area B is ¼" lower, stepped area C is ½" lower and stepped area D is 1" lower. In this particular embodiment as best shown in FIG. 3, area D is shaped resembling a diamond, which is aesthetically pleasing.

FIG. 4 is a representative isometric cross-sectional view of an embodiment of a multilevel birdbath 100 of the present invention. As best shown in FIG. 4, bottom surface 108 is a contour surface such that when multilevel birdbath 100 is filled with water, areas of different depth of water will be created. In one embodiment, bottom surface 108 is textured to provide better gripping for birds. In one embodiment, bottom surface 108 is textured with perpendicularly crossing linear crevices. In this embodiment, users can simply stroke along those linear crevices with a brush for easy cleaning.

FIG. 5 is a representative vertical cross-sectional view of an embodiment of a multilevel birdbath 100 of the present invention. As discussed, the stepped bottom surface 108 starts to gradually sloping down from rim 104 in the approximate range of 5% to 20% such that birds 90 [not shown] can enter birdbath pool 106 easily and gradually from rim 104 without a big drop. As shown in FIG. 5, bottom surface 108 will then step or grade uniformly or randomly to create a contour surface that will then create areas of varying depths of water. In one embodiment, bottom surface 108 can even be sloped upwardly above water level/rim 104 so birds can perch on those peaks.

In one embodiment, water stop 110 is optionally featured in the underside of multilevel birdbath 100. As best shown in FIG. 5, water stop 110 is a groove running along the edge of the underside of multilevel birdbath 100 which prevents water from running and/or trickling down underneath the birdbath 100. In addition, water stop 110 can also be used as a mounting ring.

FIG. 6 is a representative vertical cross-sectional view of an embodiment of a multilevel birdbath removable liner 100" of the present invention. In one embodiment, multilevel birdbath removable liner 100" is made of light and durable materials and can be placed on top or inside existing birdbaths. The main advantage of the liner 100" is that users can retain their current birdbath structures while getting the benefits of the multilevel birdbath 100 of the present invention. Also, removable liner 100" can be easily replaced or removed for cleaning so water quality is maintained efficiently.

FIG. 7 is a representative view of a method of use of a multilevel birdbath 100 of the present invention. As best shown in FIG. 7, birds 80 of varying sizes and species will be attracted to the multilevel birdbath 100 since they can find water 90 at the right depth for drinking, bathing and/or perching.

Figure 8:
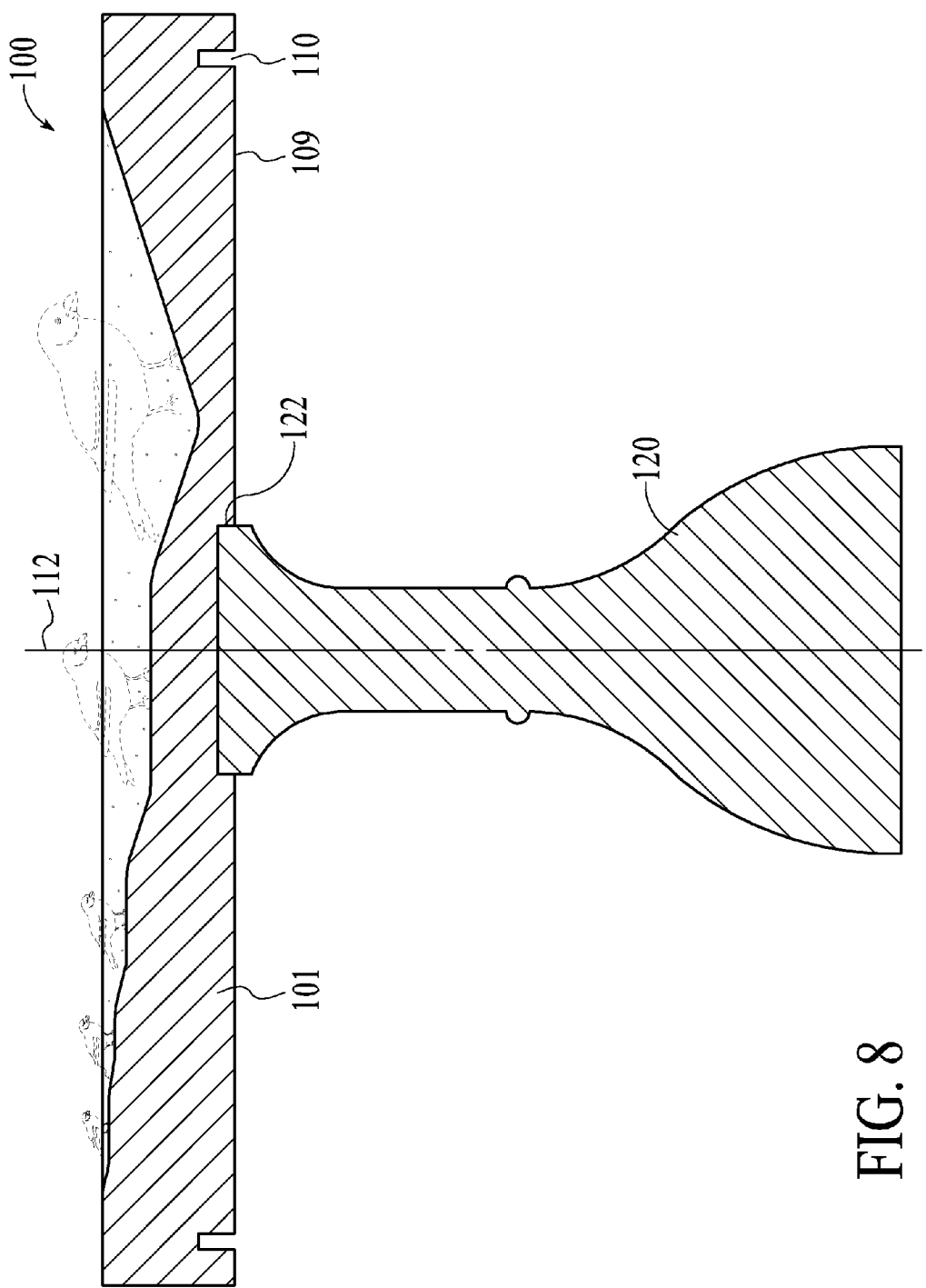
FIG. 8 is a representative section view of the multilevel birdbath 100 of the present invention.

FIG. 8 is a representative section view of the multilevel birdbath 100 of the present invention. Supporting structure 120 can be selected from the group of structures consisting of a stand, a platform, a pedestal, a block of material and a pole. A centered post connection 122 mechanically couples the main body portion of the birdbath 100 and supporting structure 120.

Figure 9:
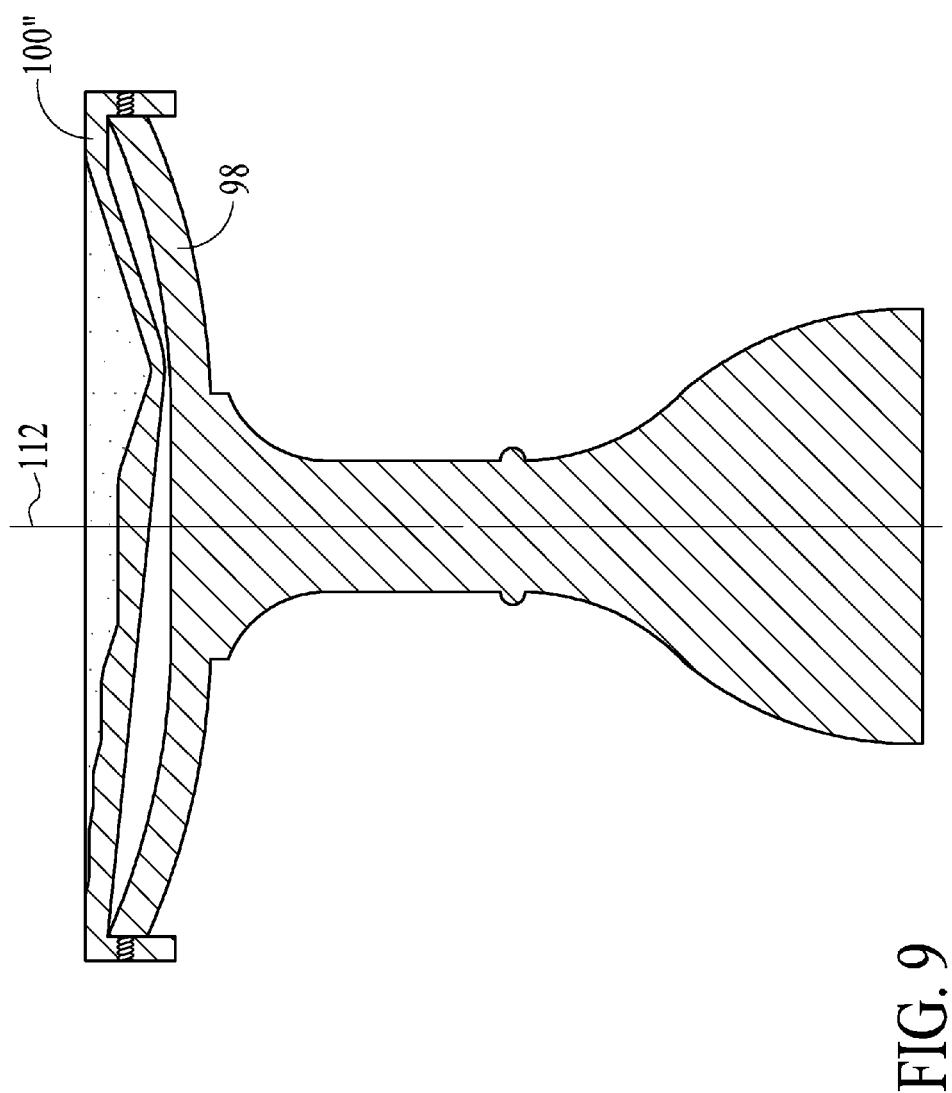
FIG. 9 is a representative section view of the multilevel birdbath liner 100" of the present invention.

FIG. 9 is a representative section view of the multilevel birdbath liner 100" of the present invention. As shown, multilevel birdbath liner 100" can be placed directly on top of an existing birdbath 98 to convert an existing birdbath 98 to a multilevel birdbath 100 of the present invention.

One embodiment of the multilevel birdbath 100 consists of a contoured upper portion 101. The contoured upper portion 101 has a periphery side wall 102 and an exterior rim 104 running around the periphery side wall 102 of the contoured upper portion 101. The rim 104 further has an outer edge 104$a$ and an inner edge 104$b$. The contoured upper portion 101 has a concave inner surface 108, the concave inner surface 108 formed co-extensively with the inner edge 104$b$ of the rim 104. The concave inner surface 108 has (1) a textured or other non-slip character, (2) a geometric centerpoint 112, (3) a first defined area 107 contiguous with a portion of the exterior rim 104 having an essentially sloping cross section, (4) a second defined area 105 contiguous with another portion of the exterior rim 104, the second defined area 105 consisting of a one or more discrete flat steps extending beyond the centerpoint 112 of the concave inner surface 108, the flat steps having one or more incrementally descending horizontal level run portions A, B, C and D interconnected by one or more non-vertical, sloping rise portions E, F, G and H throughout the second defined area of the concave inner surface 108, and (4) a lowest point 114 in the concave inner surface 108 lying between the first 107 and second 105 defined areas, the lowest point 114 being offset from the centerpoint 112 of the concave inner surface 108, wherein the concave inner surface 108 has a V-shaped cross-section bisecting both the first 107 and second 105 defined areas. The contoured upper portion 101 has a lower outer surface 109, the lower outer surface 109 further having a mechanical system 110 at its periphery for preventing water from running underneath the birdbath 100. The mechanical system 110 is located around the periphery of the lower outer surface 109. The multilevel birdbath 100 further consists of a supporting structure 120 sufficiently sturdy to support the contoured upper portion 101 when full of water and in use at the same time by one or more bathing birds 80. Finally, a mechanical connector 122 couples the lower outer surface 109 of the contoured upper portion 101 to the supporting structure 120.

Figure 10A:
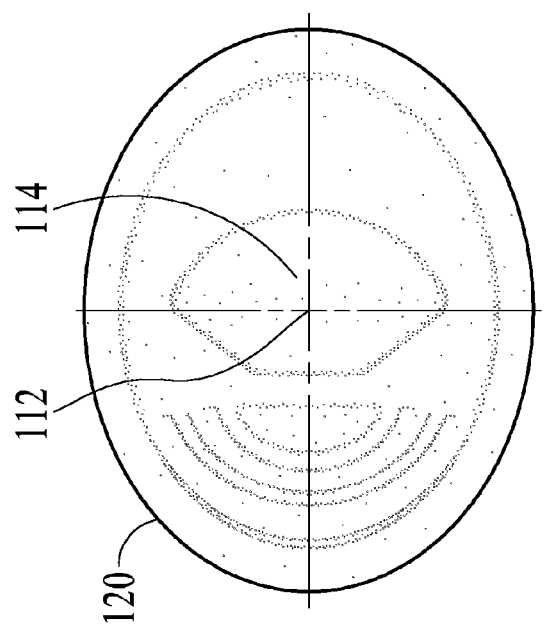
FIGS. 10A-10E are representative isometric views of embodiments of the multi-level birdbath 100 of the present invention in which the shape of the upper contoured portions are oval, square, rectangular and triangular.
Figure 10B:
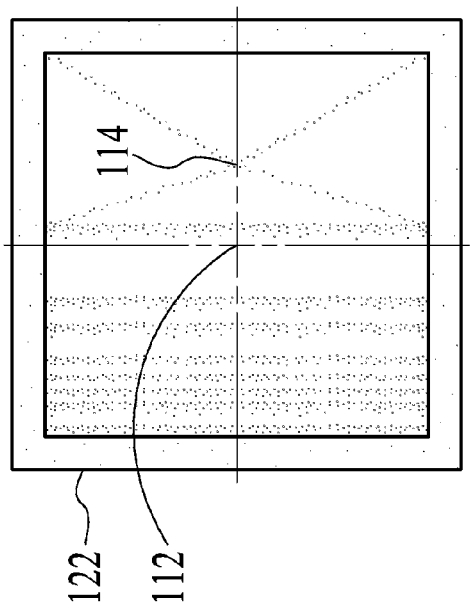
Figure 10C:
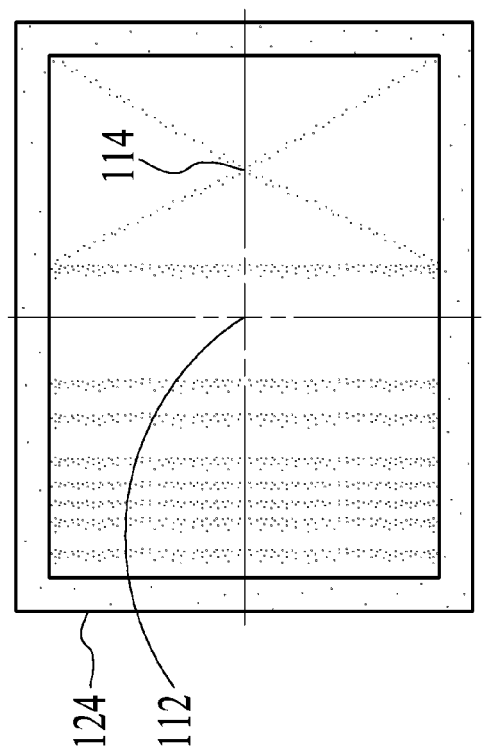
Figure 10E:
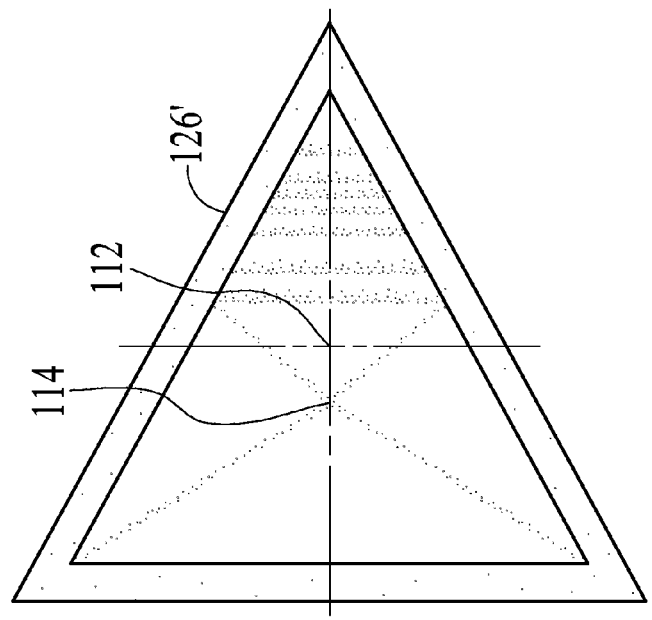
Figure 10D:
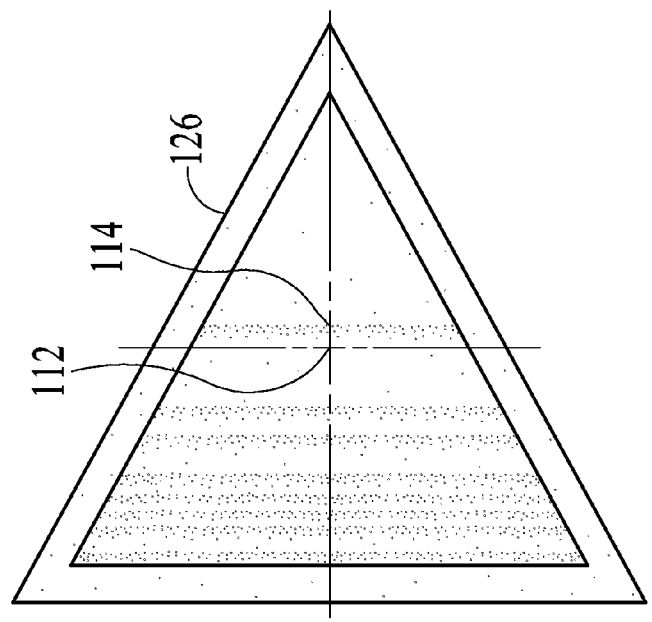

FIGS. 10A-10E are representative isometric views of embodiments of the multi-level birdbath 100 of the present invention in which the shape of the upper contoured portions are oval, square, rectangular and circular. As best shown in FIG. 10A, the upper contoured portion 120 can be in the shape of an oval. As best shown in FIG. 10B, the upper contoured portion 122 can be in the shape of an square. As best shown in FIG. 10C, the upper contoured portion 124 can be rectangular in shape. As best shown in FIG. 10D, the upper contoured portion 126 can be triangular in shape. As also best shown in FIG. 10E, the upper contoured portion 126' can be triangular in shape. In all of FIGS. 10A-10D, a centerpoint 112 is shown and a deepest or lowest area 114 is shown.

FIGS. 11A-11C are representative isometric views of embodiments of the multi-level birdbath 100 of the present invention in which the supporting structure of the multi-level birdbath of the present invention consists of a platform, a block of material, and a pole. As best shown in FIG. 11A, the supporting structure 120 can be a platform 130. As best shown in FIG. 11B, the supporting structure 120 can be a block of material 132. As best shown in FIG. 11C, the supporting structure 120 can be a pole 134.

Unless defined otherwise, all technical and scientific terms used herein have the same meaning as commonly understood by one of ordinary skill in the art to which the present invention belongs. Although any methods and materials similar or equivalent to those described can be used in the practice or testing of the present invention, the preferred methods and materials are now described. All publications and patent documents referenced in the present invention are incorporated herein by reference.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, with the limits only of the true purview, spirit and scope of the invention.

I claim:

1. A multilevel birdbath comprising:
   A contoured upper portion, the contoured upper portion having:
   A periphery;
   An exterior rim running around the periphery of the contoured upper portion, the rim further having an outer edge and an inner edge;
   A concave inner surface, the concave inner surface formed co-extensively with the inner edge of the rim, the concave inner surface having:
   (1) a textured or other non-slip character;
   (2) a geometric centerpoint;
   (3) a first defined area contiguous with a portion of the exterior rim having an essentially sloping cross section;
   (4) a second defined area contiguous with another portion of the exterior rim, the second defined area comprising a plurality of discrete flat steps extending beyond the centerpoint of the concave inner surface, the flat steps having a plurality of incrementally descending horizontal level run portions interconnected by a plurality of non-vertical, sloping rise portions throughout the second defined area of the concave inner surface, and
   (5) a lowest point in the concave inner surface lying between the first and second defined areas, the lowest point being offset from the centerpoint of the concave inner surface, wherein the concave inner surface has a V-shaped cross-section bisecting both the first and second defined areas;
   A lower outer surface, the lower outer surface further having a periphery and a mechanical system for preventing water from running underneath the birdbath, the mechanical system located around the periphery of the lower outer surface;
   A supporting structure sufficiently sturdy to support the contoured upper portion when full of water and in use at the same time by a plurality of bathing birds; and
   Mechanical connector to couple the lower outer surface of the contoured upper portion to the supporting structure.

2. The multilevel birdbath of claim 1 in which the shape of the upper contoured portion is selected from the group of shapes consisting of round, oval, square, rectangular and triangular.

3. The multilevel birdbath of claim 1 in which the upper contoured portion is made of a material selected from the group of materials consisting of cement, concrete, plaster of Paris, wood, rubber, resin, fiberglass, reinforced fiberglass, plastic, metal, natural fiber and composite materials.

4. The multilevel birdbath of claim 1 in which the supporting structure is selected from the group of structures consisting of a stand, a platform, a pedestal, a block of material and a pole.

5. The multilevel birdbath of claim 1 in which the concave inner surface is coated with non-slip coating.

* * * * *